G. SPRUNG.
ROAD TRUCK.
APPLICATION FILED MAR. 18, 1909.
933,794.
Patented Sept. 14, 1909.
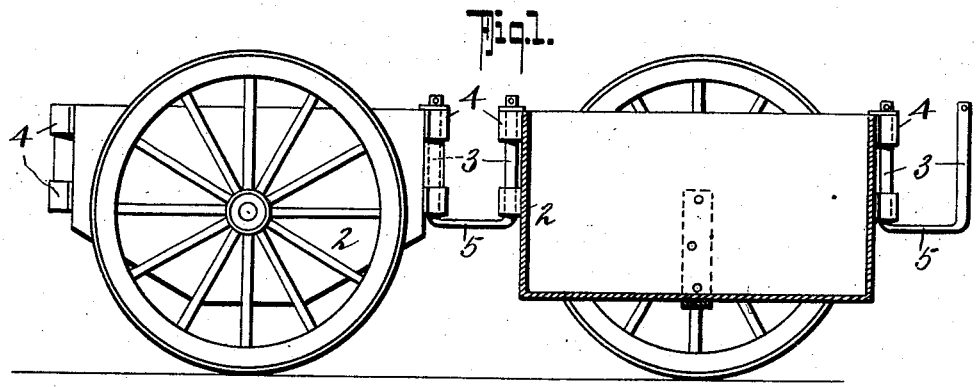
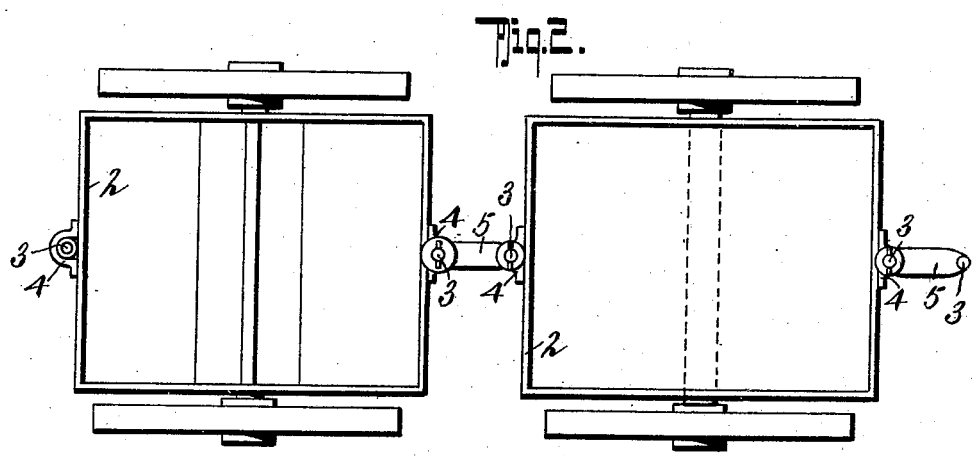
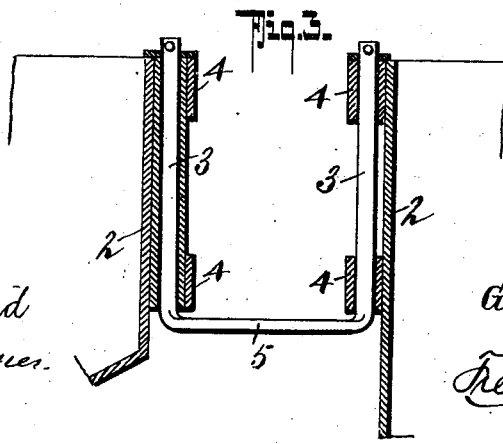
WITNESSES:
Hayward Woodard
Charles H. Wagner
INVENTOR
George Sprung
BY
Fred G. Dieterich
ATTORNEY

UNITED STATES PATENT OFFICE.

GEORGE SPRUNG, OF VANCOUVER, BRITISH COLUMBIA, CANADA.

ROAD-TRUCK.

933,794.　　　　　Specification of Letters Patent.　Patented Sept. 14, 1909.

Application filed March 18, 1909.　Serial No. 484,261.

*To all whom it may concern:*

Be it known that I, GEORGE SPRUNG, a citizen of the Dominion of Canada, residing at the city of Vancouver, in the Province of British Columbia, Canada, have invented a new and useful Road-Truck, of which the following is a specification.

This invention relates to a road transport truck having means for connecting it to other similar trucks to form a train of them for road engine transport.

The rapid advance that has been recently made in road engines renders indispensable a simple and convenient truck to be used therewith. Four wheeled wagons may be suitable for city use but for country roads I have considered that a train of two wheeled trucks is better suited not only in the facility for adjustment of the train to the requirements of the traffic but in several other respects to which attention will be drawn later.

The truck which is the subject of this application has been particularly designed for use in the conveyance of road material etc. for road making, but the essential features of it are equally applicable to a variety of uses where similar conditions prevail.

The invention is particularly described in the following specification and illustrated in the drawings by which it is accompanied, in which, Figure 1. is a side elevation and part section of a hopper and box truck coupled together, Fig. 2. is a plan of the same, and Fig. 3. an enlarged detail of the coupling connection.

In these drawings 2 represents the body of the truck which may have a hopper and drop bottom for road making, or may have a simple rectangular box body for ordinary transport. Each truck is mounted on a single pair of wheels of relatively large diameter so that the axis of the wheel is at a height from the ground which approximately corresponds to the center of gravity of the truck. The wheels are mounted on axles which may either pass through the body of the truck as shown in the left of Fig. 2 or may form a part of an axle frame passing under the truck body as shown on the right of Figs. 1 and 2. These trucks may be coupled together from either end by a U shaped coupling connection the vertical pins 3 of which are pivotally mounted on bearings on the ends of the truck body in such a position that the horizontal element 5 of the coupling is approximately in a horizontal line through the center of gravity of the connected trucks when loaded.

The horizontal element 5 of the coupling is preferably made of steel and is flattened as shown in Fig. 3 to render it both flexible and resilient. The bearings 4 should be spaced apart to afford ample support and may be formed of a short length of tube secured by clamps to the end of the truck and the pins will be retained in place by a washer and split pin or other approved means.

A simple and serviceable road truck is thus provided which may be made up into a train to suit the requirements of traffic and that offers advantages in its mobility especially fitting it for this class of work. It may be connected by either end to the engine which renders it particularly convenient when used as a conveyance of road making material.

Having now particularly described my invention and the manner of its construction I hereby declare that what I claim as new and desire to be protected in by Letters Patent is:

1. A road transport truck comprising a body portion mounted on a pair of wheels the axis of which passes approximately through the center of gravity of the truck, means for coupling either end of said truck to another truck, said means comprising a U-shaped pin, the vertical portions of which are pivotally mounted in bearings in the adjacent ends of a pair of trucks, and the horizontal element of the coupling lying approximately in a horizontal line through the centers of gravity of the trucks.

2. A road transport truck comprising in combination a body portion mounted on wheels the axis of which approximately passes through the center of gravity of the truck and means for connecting either end to a similar truck, said means comprising a U shaped connection the vertical elements of which are mounted in pivotal bearings in the adjacent ends of each truck and the horizontal element of which is flattened to form a flexible resilient connection in a line approximately that joining the centers of gravity of the connected trucks.

In testimony whereof I have signed my name to this specification in the presence of two subscribing witnesses.

GEORGE SPRUNG.

Signed in the presence of—
ROWLAND BRITTAIN,
A. G. WOOLSEY.